United States Patent
Chang et al.

(10) Patent No.: US 7,321,643 B2
(45) Date of Patent: Jan. 22, 2008

(54) SOFT DECISION DECODER, AND LOG LIKELIHOOD RATIO CALCULATOR AND METHOD THEREOF FOR ENHANCED PERFORMANCE IN SOFT DECISION DECODING

(75) Inventors: Dae-Ig Chang, Daejeon (KR); Dong-Weon Yoon, Daejeon (KR); Nae-Soo Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 669 days.

(21) Appl. No.: 10/662,195

(22) Filed: Sep. 12, 2003

(65) Prior Publication Data

US 2004/0125883 A1 Jul. 1, 2004

(30) Foreign Application Priority Data

Sep. 12, 2002 (KR) .................... 10-2002-0055302

(51) Int. Cl.
*H04L 27/06* (2006.01)
(52) U.S. Cl. ...................................... 375/341; 375/340
(58) Field of Classification Search ................ 375/261, 375/341, 316, 340, 262
See application file for complete search history.

(56) References Cited

U.S. PATENT DOCUMENTS 5,657,354 A * 8/1997 Thesling et al. ............. 375/332
6,975,669 B2 * 12/2005 Ling et al. .................. 375/141
2002/0161560 A1 * 10/2002 Abe et al. .................... 702/196
2006/0078075 A1 * 4/2006 Stamoulis et al. ........... 375/346

FOREIGN PATENT DOCUMENTS

KR 1020010010277 2/2001
KR 1020020051549 6/2002

OTHER PUBLICATIONS

Wang et al., "Soft Decision Generation for QAM with Channel Estimation Error,"IEEE Transaction on Communications, vol. 50, No. 7, Jul. 2002, pp. 1058-1061.*
Mustapha, "On Reliability Metrics for Soft-Input Decoding in Presence of Channel estimation Errors," IEEE, 2006, pp. 2548-2552.*
IEEE Journal on Selected Areas in Communications, vol. 16, No. 2, Feb. 1998, pp. 276-296.

* cited by examiner

*Primary Examiner*—Tesfaldet Bocure
(74) *Attorney, Agent, or Firm*—Blakely, Sokoloff, Taylor & Zafman

(57) ABSTRACT

Disclosed is a soft decision decoder, and a log likelihood ratio calculator for soft decision decoding and a method thereof, for realizing a generalized log likelihood ratio algorithm in consideration of channel estimation errors for performing soft decision decoding on QAM signals, which comprises multipliers for multiplying reference signals and channel estimation signals, subtractors for subtracting a receive signal of a receiver from output signals of the multipliers, first and second square calculators for squaring the subtractors' output signals and reference signals, dividers for dividing output signals of the first and second square calculators by addition values, and a comparator for comparing output signals of the dividers.

6 Claims, 3 Drawing Sheets

US 7,321,643 B2

SOFT DECISION DECODER, AND LOG LIKELIHOOD RATIO CALCULATOR AND METHOD THEREOF FOR ENHANCED PERFORMANCE IN SOFT DECISION DECODING

CROSS REFERENCE TO RELATED APPLICATION

This application claims priority to and the benefit of Korea Patent Application No. 2002-55302 filed on Sep. 12, 2002 in the Korean Intellectual Property Office, the content of which is incorporated herein by reference.

BACKGROUND OF THE INVENTION

1. (a) Field of the Invention

The present invention relates to a soft decision decoder, and a log likelihood ratio calculator and method thereof for soft decision decoding. More specifically, the present invention relates to a soft decision decoder for realizing a generalized log likelihood ratio algorithm in consideration of channel estimation errors for better performance in soft decision decoding of QAM (quadrature amplitude modulation) signals, and a log likelihood ratio calculator and method thereof for soft decision decoding.

2. (b) Description of the Related Art

As information communication techniques have evolved to mobilization and multimedia stages, the QAM method has become the most effective modulation method from among the currently used modulation schemes for realizing high-speed multimedia mobile communications using restricted frequency resources.

Also, it is required to use error correction codes such as turbo codes so as to perform reliable multimedia communications under the poor mobile communication channel environments.

However, since the turbo codes need soft decision decoding, and the QAM signals carry information through phases and amplitudes, a soft decision decoding algorithm in consideration of channel estimation errors is necessary.

A conventional log likelihood ratio algorithm for soft decision decoding will now be described in detail.

A symbol x of the QAM signals in the M-ary QAM has one of M signal symbols $\{x_1, x_2, \ldots, x_M\}$, and each symbol $x_i$ is constituted by k bits of $\{c_1, c_2, \ldots, c_k\}$ assuming that $M=2^k$, the bit $c_i$ configuring the respective symbols has one of values +1 and −1, and a generation probability of +1 and −1 is respectively ½.

In general, when a QAM transmit signal x is passed through a channel state a and has noise n added thereto, and is received as y at a receiver, the receive signal y is given as Equation 1.

$$y = ax + n \qquad \text{Equation 1}$$

Since a is a channel gain from Equation 1, a has a constant value for a symbol duration of the QAM signals, and n is AWGN (additive white Gaussian noise).

When a channel estimator of the receiver estimates the channel, a channel estimation value a is given as Equation 2.

$$â = a + e \qquad \text{Equation 2}$$

From Equation 2, e is assumed to have a Gaussian distribution in consideration of channel estimation errors.

When not considering the channel estimation errors, that is, if e=0 so â=a, a log likelihood ratio for bit decision in this case is given as Equation 3.

$$\gamma(c_i) = \ln \sum_{x^+ \in \{x: c_i = +1\}} \exp\left(-\frac{|y - âx^+|^2}{\sigma_n^2}\right) - \ln \sum_{x^- \in \{x: c_i = -1\}} \exp\left(-\frac{|y - âx^-|^2}{\sigma_n^2}\right) \overset{+1}{\underset{-1}{\gtrless}} 1 \qquad \text{Equation 3}$$

From Equation 3, a generalized log likelihood ratio algorithm for soft decision decoding with no consideration of the channel estimation errors is given as Equation 4.

$$\tilde{\gamma}(c_i) = \min_{x^- \in \{x: c_i = -1\}} |y - âx^-|^2 - \min_{x^+ \in \{x: c_i = +1\}} |y - âx^+|^2 \overset{+1}{\underset{-1}{\gtrless}} 0 \qquad \text{Equation 4}$$

where the reference signal $x^+$ is a symbol x including the case of $c_i=+1$ from among the bits configuring the symbol x, and the reference signal $x^-$ is a symbol x including the case of $c_i=-1$ from among the bits configuring the symbol x.

FIG. 1 shows a conventional configuration of a soft decision decoder of QAM signals.

As shown in FIG. 1, the soft decision decoder comprises log likelihood ratio calculators 10, a subtractor 20, and a comparator 30.

The log likelihood ratio calculator 10 calculates log likelihood ratios of (−) and (+) signals as given in Equations 3 and 4. The subtractor 20 calculates a difference of the log likelihood ratios calculated by using the (+) and (−) signals. The comparator 30 receives calculates results on the difference of the log likelihood ratios from the subtractor 20, and determines a soft decision value of the QAM signal as (+) or (−) according to comparison results of a positive number and a negative number of the difference of the log likelihood ratios.

FIG. 2 shows a block diagram of a conventional log likelihood ratio calculator for soft decision decoding.

As shown in FIG. 2, the log likelihood ratio calculator comprises a multiplier 11, a subtractor 12, a square calculator 13, and a comparator 14.

The multiplier 11 multiplies a reference signal and a channel state a with no consideration of channel estimation errors, the subtractor 12 subtracts an output signal of the multiplier 11 from a receive signal, and the square calculator 13 squares an output signal of the subtractor 12. The comparator 14 compares output signals of the square calculator 13.

FIG. 2 is a configuration of the log likelihood ratio calculator corresponding to a first term or a second term of Equation 4.

Therefore, as shown in FIG. 1, the whole configuration for soft decision decoding includes two log likelihood ratio calculators of FIG. 2, the subtractor 20 performs log subtraction, and the comparator 30 determines a soft decision value of the QAM signal as 1 when a subtraction result by the subtractor 20 is greater than 0, and determines the soft decision value of the QAM signal as −1 when a subtraction result by the subtractor 20 is less than 0.

However, since the conventional log likelihood ratio calculator for soft decision decoding does not consider channel estimation errors, the conventional log likelihood ratio calculator recovers signals while failing to completely reflect the actual channel estimation errors.

Therefore, the modulation method for the QAM signals having information be loaded to the amplitude thereof needs decoding in consideration of the channel estimation errors for the optimized signal recovery. However, since the conventional log likelihood ratio calculator does not completely reflect the channel estimation errors and performs decoding, a soft decision decoding performance on the receive QAM signals is lowered.

SUMMARY OF THE INVENTION

It is an advantage of the present invention to provide a log likelihood ratio calculator for soft decision decoding, and a method thereof, for realizing a log likelihood ratio algorithm in consideration of channel estimation errors to perform optimal signal recovery and improve decoding performance of receive signals.

In one aspect of the present invention, a soft decision decoder comprises:

a plurality of log likelihood ratio calculators for using a receive signal y with noise input from a receiver so as to perform soft decision decoding on a QAM signal, reflecting of channel estimation errors, and calculating of a log likelihood ratio of a positive number and a negative number;

a subtractor for determining a difference between the positive signal and the negative signal output by the log likelihood ratio calculators; and a comparator for receiving a calculation result on the difference of the log likelihood ratio of the subtractor, and determining the QAM signal to be positive or negative according to a positive/negative state of the calculation result.

The log likelihood ratio calculator comprises:

M multipliers for receiving a channel estimate â estimated by the receiver, and receiving M reference signals $x_i$ from a transmitter to respectively multiply them;

M subtractors for receiving M multiplication values multiplied by the multipliers to subtract them from a receive signal y received from the receiver;

M first square calculators for respectively squaring M subtraction values subtracted by the subtractors;

M second square calculators for receiving the reference signals $x_i$ to respectively square them;

M adders for respectively adding M square values of the reference signals input by the second square calculators and a ratio ρ of a symbol noise bandwidth of a QAM signal and a channel estimation filter noise bandwidth;

M dividers for dividing M square values input by the first square calculators by the M addition values input by the adders 122; and a comparator for selecting the minimum value from among the M division values input by the dividers 123, and outputting a log likelihood ratio.

In another aspect of the present invention, a method for calculating a log likelihood ratio for soft decision decoding, comprises:

(a) receiving a channel estimate â estimated by a receiver, receiving M reference signals $x_i$ from a transmitter to respectively multiply them, and receiving multiplication values to subtract them from a receive signal y received from the receiver;

(b) respectively squaring subtraction values and the reference signals $x_i$ in (a);

(c) respectively adding square values of the reference signals input in (b) and a ratio ρ of a symbol noise bandwidth of a QAM signal and a channel estimation filter noise bandwidth;

(d) dividing square values of the subtraction values input in (b) by the addition values added in (c); and (e) selecting the minimum value from among the values input in (d), and outputting a log likelihood ratio for soft decision decoding in consideration of channel estimation errors.

Outputting a log likelihood ratio in (e) follows Equation 15.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 3:
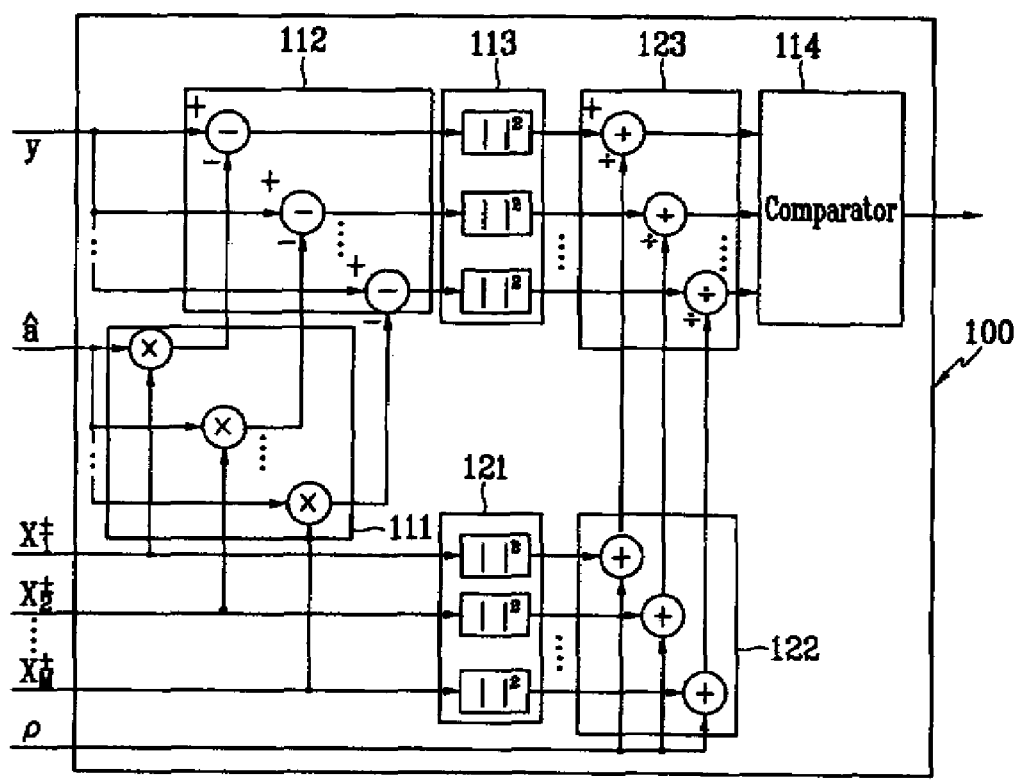
FIG. 3 shows a log likelihood ratio calculator for soft decision decoding according to a preferred embodiment of the present invention.

FIG. 3 shows a log likelihood ratio calculator for soft decision decoding according to a preferred embodiment of the present invention.

As shown in FIG. 3, the log likelihood ratio calculator 100 comprises M multipliers 111, M subtractors 112, first and second square calculators 113 and 121, M adders 122, M dividers 123, and a comparator 114.

The M multipliers 111 receive a channel estimation value â estimated by a receiver, and receive M reference signals $x_i$ from a transmitter to respectively multiply them. The M subtractors 112 receive M multiplication values multiplied by the multipliers 111 to subtract them from a receive signal y received from the receiver.

The M first square calculators 113 respectively square M subtraction values subtracted by the subtractors 112, and M second square calculators 121 receive the reference signals $x_i$ to square them.

The M adders 122 respectively add M square values of the reference signals input by the second square calculators 121 and a ratio ρ of a symbol noise bandwidth of a QAM signal and a channel estimation filter noise bandwidth.

The M dividers 123 divide M square values input by the first square calculators 113 by the M addition values input by the adders 122. The comparator 114 selects the minimum value from among the M division values input by the dividers 123, and outputs a log likelihood ratio for soft decision decoding in consideration of channel estimation errors.

Figure 1:
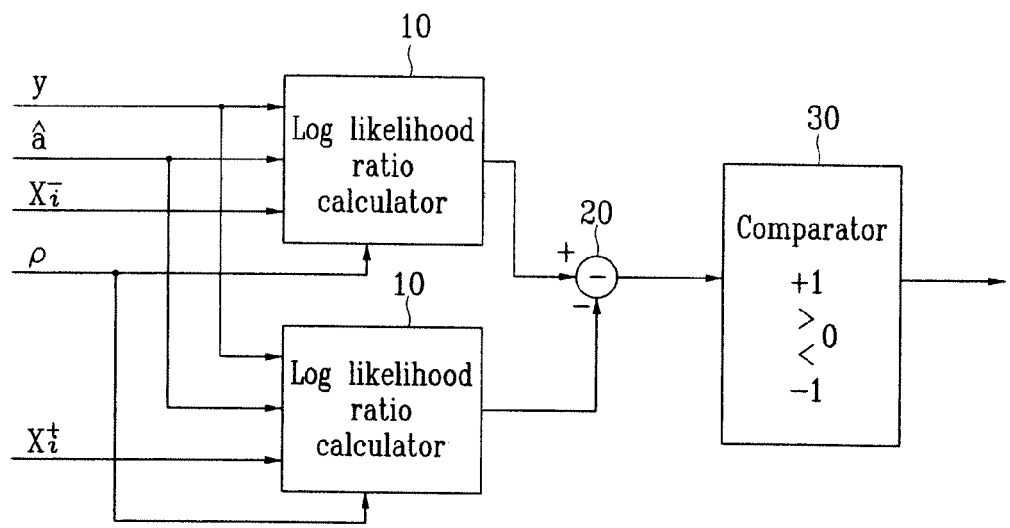
FIG. 1 shows a general soft decision decoder for QAM signals.

As to the soft decision decoder having the above-configured two log likelihood ratio calculators, the subtractor determines the difference of the log likelihood ratio of the positive (+) signal and the negative (−) signal output from the respective log likelihood ratio calculators 100 referring to FIG. 1, and the comparator 114 receives calculation results on the log likelihood ratio difference of the subtractors 112 to determine the QAM signals to be positive (+) or negative (−) according to positive and negative number states of the calculation results.

The soft decision decoder receives the receive signal y with noise from the receiver, receives a channel estimation value â estimated by the channel estimator of the receiver, receives the reference signals $x_i$, receives the ratio ρ of the symbol noise bandwidth and the channel estimation filter noise bandwidth of the QAM signal, and outputs performance-improved soft decision decoding signals.

The above-configured soft decision decoder and the log likelihood ratio calculator for soft decision decoding will be described using equations.

When the channel estimation errors are provided in Equation 2, an evaluation thereof is required. Since the AWGN n and the channel estimation errors e are independent of each other in Equations 1 and 2, and they are to be considered with respect to the I and Q channels, respectively, the AWGN n and the channel estimation errors e respectively have 2-dimensional distributions.

Therefore, the receive signal y and the channel estimation value â have a joint PDF (probability density function) as given in Equation 5.

$$p(y, \hat{a} | x) = \frac{1}{\pi \sigma_n^2} \exp\left(-\frac{|y - ax|^2}{\sigma_n^2}\right) \frac{1}{\pi \sigma_e^2} \exp\left(-\frac{|\hat{a} - a|^2}{\sigma_e^2}\right) \quad \text{Equation 5}$$

$$= \frac{1}{\pi^2 \sigma_n^2 \sigma_e^2} \exp\left[-\left(\frac{|y - ax|^2}{\sigma_n^2} + \frac{|\hat{a} - a|^2}{\sigma_e^2}\right)\right]$$

A log likelihood ratio on the i-th bit of the M-ary QAM signal symbol is found using Equation 5, as given in Equation 6.

Equation 6

$$\gamma(c_i) = \ln \frac{p(y, \hat{a} | c_i = +1)}{p(y, \hat{a} | c_i = -1)}$$

$$= \ln \frac{\sum_{c_1} \cdots \sum_{c_{i-1}} \sum_{c_{i+1}} \cdots \sum_{c_k} p(y, \hat{a} | c_1, \cdots, c_i = +1, \cdots, c_k)}{\sum_{c_1} \cdots \sum_{c_{i-1}} \sum_{c_{i+1}} \cdots \sum_{c_k} p(y, \hat{a} | c_1, \cdots, c_i = -1, \cdots, c_k)}$$

$$= \ln \frac{\sum_{x^+ \in \{x : c_i = +1\}} p(y, \hat{a} | x^+)}{\sum_{x^- \in \{x : c_i = -1\}} p(y, \hat{a} | x^-)} \gtrless 1$$

Recalculation of Equation 6 by using Equation 5 gives rise to Equation 7.

$$\gamma(c_i) = \ln \frac{\sum_{x^+ \in \{x : c_i = +1\}} \exp\left[-\left(\frac{|y - ax^+|^2}{\sigma_n^2} + \frac{|\hat{a} - a|^2}{\sigma_e^2}\right)\right]}{\sum_{x^- \in \{x : c_i = -1\}} \exp\left[-\left(\frac{|y - ax^-|^2}{\sigma_n^2} + \frac{|\hat{a} - a|^2}{\sigma_e^2}\right)\right]} \gtrless 1 \quad \text{Equation 7}$$

It is needed to introduce a generalized likelihood ratio concept so as to find a threshold value from Equation 7.

The generalized likelihood ratio is found from Equation 8 maximized in the channel state of a.

Equation 8

$$\tilde{\gamma}(c_i) = \ln \frac{\max_a \left\{ \sum_{x^+ \in \{x : c_i = +1\}} \exp\left[-\left(\frac{|y - ax^+|^2}{\sigma_n^2} + \frac{|\hat{a} - a|^2}{\sigma_e^2}\right)\right] \right\}}{\max_a \left\{ \sum_{x^- \in \{x : c_i = -1\}} \exp\left[-\left(\frac{|y - ax^-|^2}{\sigma_n^2} + \frac{|\hat{a} - a|^2}{\sigma_e^2}\right)\right] \right\}} \gtrless 1$$

where since the exponential function is an increasing function, the largest exponent in Equation 8 becomes dominant, and Equation 8 can be rewritten as Equation 9.

Equation 9

$$\max_a \left\{ \sum_{x^\pm \in \{x : c_i = \pm 1\}} \exp\left[-\left(\frac{|y - ax^\pm|^2}{\sigma_n^2} + \frac{|\hat{a} - a|^2}{\sigma_e^2}\right)\right] \right\}$$

$$\approx \max_a \left\{ \exp\left[-\left(\frac{|y - a\tilde{x}(a)|^2}{\sigma_n^2} + \frac{|\hat{a} - a|^2}{\sigma_e^2}\right)\right] \right\}$$

$$= \max_a \left\{ \max_{x^\pm \in \{x : c_i = \pm 1\}} \left\{ \exp\left[-\left(\frac{|y - ax^\pm|^2}{\sigma_n^2} + \frac{|\hat{a} - a|^2}{\sigma_e^2}\right)\right] \right\} \right\}$$

$$= \max_{x^\pm \in \{x : c_i = \pm 1\}} \left\{ \max_a \left\{ \exp\left[-\left(\frac{|y - ax^\pm|^2}{\sigma_n^2} + \frac{|\hat{a} - a|^2}{\sigma_e^2}\right)\right] \right\} \right\}$$

where $$\tilde{x}(a) = \underset{x^\pm \in \{x : c_i = \pm 1\}}{\arg\max} \left\{ \exp\left[-\left(\frac{|y - ax^\pm|^2}{\sigma_n^2} + \frac{|\hat{a} - a|^2}{\sigma_e^2}\right)\right] \right\}$$

and x̃(a) is a symbol corresponding to the dominant term in Equation 9.

To find $$\max_a \left\{ \exp\left[-\left(\frac{|y - ax|^2}{\sigma_n^2} + \frac{|\hat{a} - a|^2}{\sigma_e^2}\right)\right] \right\}$$

from Equation 9 is to maximize Equation 10.

$$H_{y, \hat{a}}(a) = -\left(\frac{|y - ax|^2}{\sigma_n^2} + \frac{|\hat{a} - a|^2}{\sigma_e^2}\right) \quad \text{Equation 10}$$

The a for maximizing Equation 10 is found from Equation 11 by partially differentiating Equation 10 with respect to a.

$$\frac{\partial H_{y,\hat{a}}(a)}{\partial a} = -\left(\frac{(\hat{a}-a)*(-1)}{\sigma_e^2} + \frac{(y-ax)*(-x)}{\sigma_n^2}\right) = 0 \quad \text{Equation 11}$$

Equation 11 results in Equation 12.

$$a_{ML} = \frac{x*y\sigma_e^2 + \hat{a}\sigma_n^2}{|x|^2\sigma_e^2 + \sigma_n^2} \quad \text{Equation 12}$$

$$\max_a \left\{ \exp\left[-\left(\frac{|y-ax|^2}{\sigma_n^2} + \frac{|\hat{a}-a|^2}{\sigma_e^2}\right)\right]\right\} = \exp\left(-\frac{|y-\hat{a}x|^2}{|x|^2\sigma_e^2 + \sigma_n^2}\right) \quad \text{Equation 13}$$

Equation 13 is found from Equation 12, and recalculation of Equation 9 by using Equation 13 becomes Equation 14.

$$\max_a \left\{ \max_{x^\pm \in \{x: c_i = \pm 1\}} \left\{\exp\left[-\left(\frac{|y-ax^\pm|^2}{\sigma_n^2} + \frac{|\hat{a}-a|^2}{\sigma_e^2}\right)\right]\right\}\right\} = \quad \text{Equation 14}$$

$$\max_{x^\pm \in \{x: c_i = \pm 1\}} \left\{\exp\left[-\frac{|y-\hat{a}x^\pm|^2}{|x^\pm|^2\sigma_e^2 + \sigma_n^2}\right]\right\}$$

Finally, Equation 8 becomes Equation 15 as a generalized log likelihood ratio for soft decision decoding in consideration of the channel estimation errors by using Equation 14.

$$\tilde{\gamma}(c_i) \approx \ln \frac{\max_{x^+ \in \{x: c_i = +1\}} \left\{\exp\left(-\frac{|y-\hat{a}x^+|^2}{|x^+|^2\sigma_e^2 + \sigma_n^2}\right)\right\}}{\max_{x^- \in \{x: c_i = -1\}} \left\{\exp\left(-\frac{|y-\hat{a}x^-|^2}{|x^-|^2\sigma_e^2 + \sigma_n^2}\right)\right\}} \gtreqless 1 \quad \text{Equation 15}$$

$$= \max_{x^+ \in \{x: c_i = +1\}} \left\{-\frac{|y-\hat{a}x^+|^2}{(|x^+|^2 + \rho)\sigma_e^2}\right\} -$$

$$\max_{x^- \in \{x: c_i = -1\}} \left\{-\frac{|y-\hat{a}x^-|^2}{(|x^-|^2 + \rho)\sigma_e^2}\right\} \gtreqless 0$$

$$= \min_{x^- \in \{x: c_i = -1\}} \left\{\frac{|y-\hat{a}x^-|^2}{|x^-|^2 + \rho}\right\} -$$

$$\min_{x^+ \in \{x: c_i = +1\}} \left\{\frac{|y-\hat{a}x^+|^2}{|x^+|^2 + \rho}\right\} \begin{array}{c}+1\\\gtreqless\\-1\end{array} 0$$

where $$\rho = \frac{\sigma_n^2}{\sigma_e^2},$$

which can be found from Equation 16.

$$\rho = \frac{\sigma_n^2}{\sigma_e^2} = \frac{BW_n}{BW_e} \quad \text{Equation 16}$$

where $BW_n$ is a QAM signal symbol noise bandwidth, and $BW_e$ is a channel estimation filter noise bandwidth.

As to the final log likelihood ratio given as Equation 15, the second square calculators 121 square the reference signal $x_i$, and the adders 122 add the square values of the second square calculators 121 and the ratio $\rho$ of the QAM signal symbol noise bandwidth and the channel estimation filter noise bandwidth.

After this, the dividers 123 divide the signals output by the first square calculators 113 by the signals output by the adders 122, and the comparator 114 compares output signals of the dividers 123 to output a log likelihood ratio in consideration of the channel estimation errors through the optimized signal recovery.

As a result, the log likelihood ratio calculator shown in FIG. 3 realizes the log likelihood ratio for soft decision decoding of the QAM signal given as Equation 15.

In this instance, the reference signals $x^+$ are symbols x including the case of $c_i = +1$ from among the bits configuring the symbols x, and the reference signals $x^-$ are symbols x including the case of $c_i = -1$ from among the bits configuring the symbols x.

Figure 2:
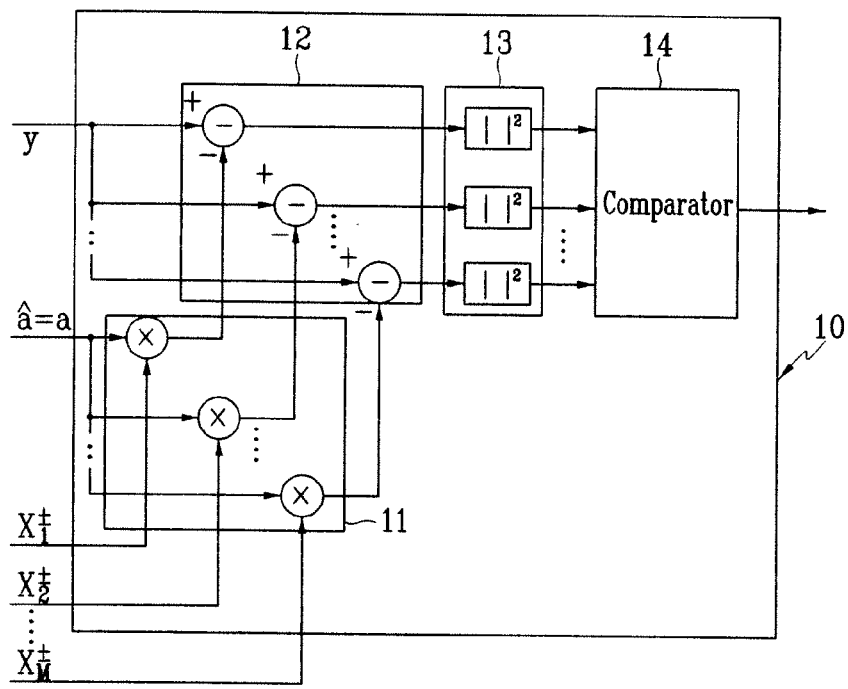
FIG. 2 shows a block diagram of a conventional log likelihood ratio calculator for soft decision decoding.
Figure 4:
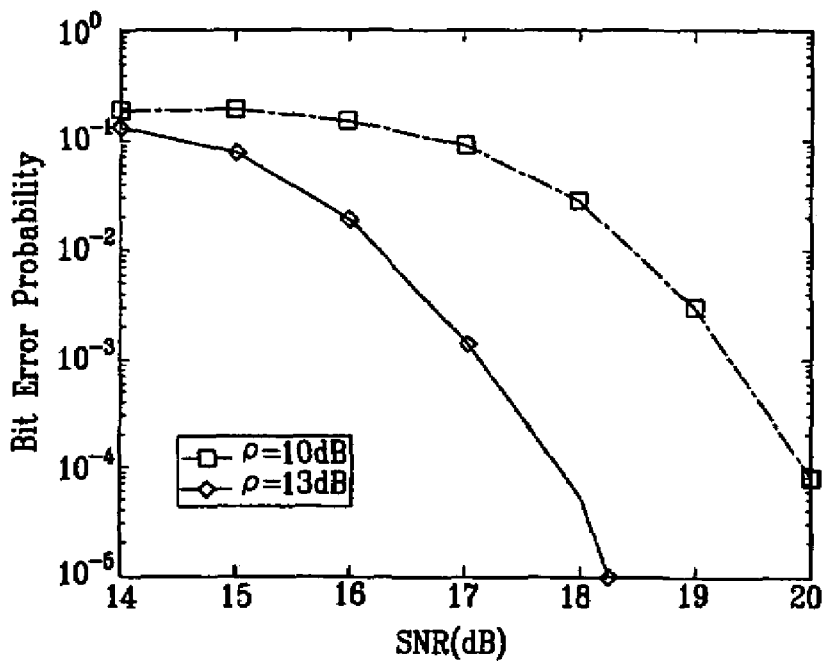
FIG. 4 shows a graph for a bit error probability performance for a 64-QAM signal decoded by the log likelihood ratio calculator realized in FIG. 2.
Figure 5:
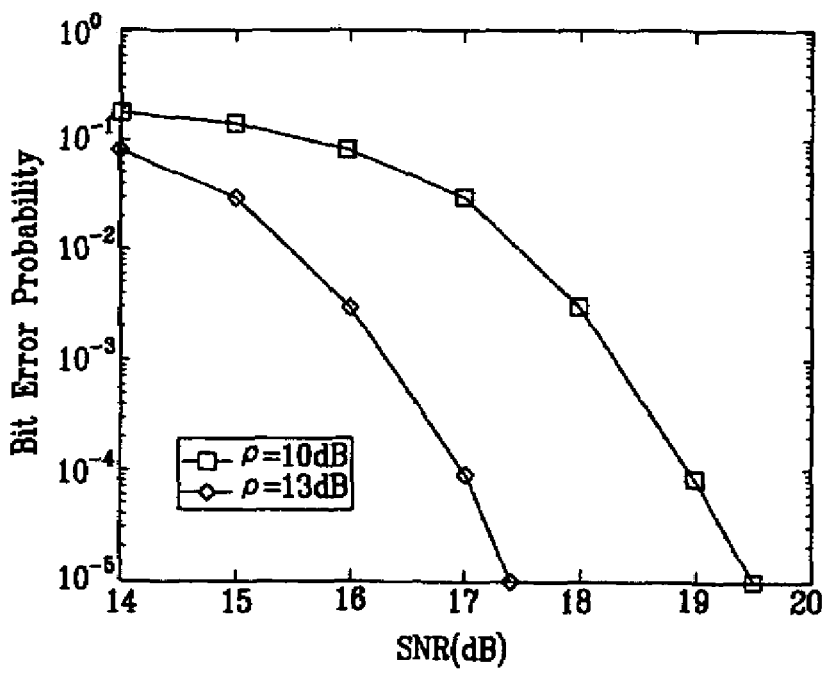
FIG. 5 shows a graph for a bit error probability performance for a 64-QAM signal decoded by the log likelihood ratio calculator for soft decision decoding according to a preferred embodiment of the present invention.

FIG. 4 shows simulation results for a decoding bit error probability performance for a turbo-coded 64-QAM signal by the conventional log likelihood ratio calculator realized in FIG. 2, and FIG. 5 shows simulation results for a decoding bit error probability performance for a turbo-coded 64-QAM signal by the log likelihood ratio calculator for soft decision decoding according to a preferred embodiment of the present invention.

Assuming that $\rho = 10$ and 13 dB, and comparing the graphs of FIGS. 4 and 5, the log likelihood ratio calculator shown in FIG. 5 has a signal power gain substantially greater than 1 dB so as to obtain the same bit error probability performance (e.g., $10^{-5}$) as that of the conventional log likelihood ratio calculator, thereby improving the soft decision decoding performance.

The improvement of the soft decision decoding performance is generated by the channel estimation error considered terms in the denominator of Equation 15 when comparing the Equations 4 and 15.

Therefore, decoding is executed without completely reflecting the actual channel estimation errors because the channel estimation errors are not considered in Equation 4, but the decoding with completely reflected channel estimation errors is executed in Equation 15 to thereby enable performance improvements for signal recovery and improve the SNR (signal to noise ratio).

As described, since the soft decision decoder and the log likelihood ratio calculator and method for soft decision decoding use a generalized log likelihood ratio to perform soft decision signal decoding with reflection of the channel estimation errors, decoding performance on the receive signals are improved through the optimized signal recovery, and the SNR is improved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A soft decision decoder comprising:
   a first log likelihood ratio calculator and a second log likelihood ratio calculator, for using a receive signal y with noise input from a receiver so as to perform soft decision decoding on a QAM (quadrature amplitude modulation) signal, the first log likelihood ratio calculator and the second log likelihood ratio calculator incorporating channel estimation errors in calculating a log likelihood ratio of a positive signal ($x^+$) and a negative signal ($x^-$), respectively;
   a subtractor for determining a difference between outputs of the log likelihood ratio calculators; and a comparator for receiving a calculation result on the difference of the log likelihood ratios of the subtractor, and determining the QAM signal to be positive or negative according to a positive/negative state of the calculation result, wherein each of the log likelihood ratio calculators comprises M adders for respectively adding M square values of M reference signals $x_i$ and a ratio $\rho$ of a symbol noise bandwidth of a QAM signal and a channel estimation filter noise bandwidth.

2. The soft decision decoder of claim 1, wherein each of the log likelihood ratio calculators comprises:

M multipliers for receiving a channel estimate $\hat{a}$ estimated by the receiver, and receiving the M reference signals $x_i$ from a transmitter to respectively multiply them;

M subtractors for receiving M multiplication values multiplied by the multipliers to subtract them from the receive signal y received from the receiver;

M first square calculators for respectively squaring M subtraction values subtracted by the subtractors;

M second square calculators for receiving the reference signals $x_i$ to respectively square them;

M dividers for dividing M square values input by the first square calculators by the M addition values input by the adders; and a comparator for selecting the minimum value from among the M division values input by the dividers, and outputting a log likelihood ratio.

3. A log likelihood ratio calculator for soft decision decoding, comprising:

M multipliers for receiving a channel estimation value $\hat{a}$ estimated by the receiver, and receiving M reference signals $x_i$ from a transmitter to respectively multiply them;

M subtractors for receiving M multiplication values multiplied by the multipliers to subtract them from a receive signal y received from the receiver;

M first square calculators for respectively squaring M subtraction values subtracted by the subtractors;

M second square calculators for receiving the reference signals $x_i$ to respectively square them;

M adders for respectively adding M square values of the reference signals input by the second square calculators and a ratio $\rho$ of a symbol noise bandwidth of a QAM signal and a channel estimation filter noise bandwidth;

M dividers for dividing M square values input by the first square calculators by the M addition values input by the adders; and a comparator for selecting the minimum value from among the M division values input by the dividers, and outputting a log likelihood ratio for soft decision decoding in consideration of channel estimation errors.

4. The log likelihood ratio calculator of claim 3, wherein the log likelihood ratio output by the comparator is given as follows:

$$\tilde{\gamma}(c_i) \approx \ln \frac{\max_{x^+ \in \{x: c_i=+1\}} \left\{ \exp\left(-\frac{|y-\hat{a}x^+|^2}{|x^+|^2\sigma_e^2+\sigma_n^2}\right) \right\}}{\max_{x^- \in \{x: c_i=-1\}} \left\{ \exp\left(-\frac{|y-\hat{a}x^-|^2}{|x^-|^2\sigma_e^2+\sigma_n^2}\right) \right\}} \gtreqless 1$$

$$= \max_{x^+ \in \{x: c_i=+1\}} \left\{ -\frac{|y-\hat{a}x^+|^2}{(|x^+|^2+\rho)\sigma_e^2} \right\} -$$

$$\max_{x^- \in \{x: c_i=-1\}} \left\{ -\frac{|y-\hat{a}x^-|^2}{(|x^-|^2+\rho)\sigma_e^2} \right\} \gtreqless 0$$

$$= \min_{x^- \in \{x: c_i=-1\}} \left\{ \frac{|y-\hat{a}x^-|^2}{|x^-|^2+\rho} \right\} -$$

$$\min_{x^+ \in \{x: c_i=+1\}} \left\{ \frac{|y-\hat{a}x^+|^2}{|x^+|^2+\rho} \right\} \overset{+1}{\underset{-1}{\gtreqless}} 0$$

where $$\rho = \frac{\sigma_n^2}{\sigma_e^2} = \frac{BW_n}{BW_e},$$

$BW_n$ is a QAM signal symbol noise bandwidth, and $BW_e$ is a channel estimation filter noise bandwidth.

5. A method for calculating a log likelihood ratio for soft decision decoding, comprising:

(a) receiving a channel estimation value $\hat{a}$ estimated by a receiver, receiving M reference signals $x_i$ from a transmitter to respectively multiply them, and receiving multiplication values to subtract them from a receive signal y received from the receiver;

(b) respectively squaring subtraction values and the reference signals $x_i$ in (a);

(c) respectively adding square values of the reference signals input in (b) and a ratio $\rho$ of a symbol noise bandwidth of a QAM signal and a channel estimation filter noise bandwidth;

(d) dividing square values of the subtraction values input in (b) by the addition values added in (c); and (e) selecting the minimum value from among the values input in (d), and outputting a log likelihood ratio for soft decision decoding in consideration of channel estimation errors.

6. The method of claim 5, wherein outputting a log likelihood ratio in (e) follows the subsequent equation:

$$\tilde{\gamma}(c_i) \approx \ln \frac{\max_{x^+ \in \{x: c_i=+1\}} \left\{ \exp\left(-\frac{|y-\hat{a}x^+|^2}{|x^+|^2\sigma_e^2+\sigma_n^2}\right) \right\}}{\max_{x^- \in \{x: c_i=-1\}} \left\{ \exp\left(-\frac{|y-\hat{a}x^-|^2}{|x^-|^2\sigma_e^2+\sigma_n^2}\right) \right\}} \gtreqless 1$$

$$= \max_{x^+ \in \{x: c_i=+1\}} \left\{ -\frac{|y-\hat{a}x^+|^2}{(|x^+|^2+\rho)\sigma_e^2} \right\} -$$

$$\max_{x^- \in \{x: c_i=-1\}} \left\{ -\frac{|y-\hat{a}x^-|^2}{(|x^-|^2+\rho)\sigma_e^2} \right\} \gtreqless 0$$

$$= \min_{x^- \in \{x: c_i=-1\}} \left\{ \frac{|y-\hat{a}x^-|^2}{|x^-|^2+\rho} \right\} -$$

$$\min_{x^+ \in \{x: c_i=+1\}} \left\{ \frac{|y-\hat{a}x^+|^2}{|x^+|^2+\rho} \right\} \overset{+1}{\underset{-1}{\gtreqless}} 0$$

where $$\rho = \frac{\sigma_n^2}{\sigma_e^2} = \frac{BW_n}{BW_e},$$

$BW_n$ is a QAM signal symbol noise bandwidth, and $BW_e$ is a channel estimation filter noise bandwidth.

* * * * *